United States Patent
Vijithakumara (10) Patent No.: US 11,180,114 B1
(45) Date of Patent: Nov. 23, 2021

(54) SYSTEMS AND METHODS FOR KEY FOB COMMUNICATION DISCONNECTION

(71) Applicant: Toyota Motor North America, Inc., Plano, TX (US)

(72) Inventor: Evan A. Vijithakumara, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 16/869,067

(22) Filed: May 7, 2020

(51) Int. Cl.
| | |
|---|---|
| G05B 19/02 | (2006.01) |
| B60R 25/20 | (2013.01) |
| G08B 3/10 | (2006.01) |
| H04W 76/38 | (2018.01) |

(52) U.S. Cl.
CPC ............ B60R 25/2009 (2013.01); G08B 3/10 (2013.01); H04W 76/38 (2018.02)

(58) Field of Classification Search
CPC ...... B60R 25/2009; H04W 76/38; G08B 3/10
USPC ....................................................... 340/4.34
See application file for complete search history.

(56) References Cited

U.S. PATENT DOCUMENTS

| | | | | |
|---|---|---|---|---|
| 6,228,696 | B1 * | 5/2001 | Nguyen | ............ H01L 27/0629 257/E27.016 |
| 7,463,134 | B1 * | 12/2008 | Stilley | .................... A45C 11/18 340/5.61 |
| 9,305,410 | B2 | 4/2016 | Lickfelt et al. | |
| 9,379,567 | B2 * | 6/2016 | Kracker | ................ B60R 25/406 |
| 9,754,431 | B2 | 9/2017 | Sigal et al. | |
| 9,902,368 | B2 | 2/2018 | Maiwand et al. | |
| 9,940,764 | B2 | 4/2018 | Van Wiemeersch et al. | |
| 9,988,015 | B2 | 6/2018 | Kim et al. | |
| 2005/0040933 | A1 | 2/2005 | Huntzicker | |
| 2007/0182582 | A1 | 8/2007 | Booher et al. | |
| 2008/0290990 | A1 | 11/2008 | Schaffzin et al. | |
| 2009/0243791 | A1 * | 10/2009 | Partin | .................... G08C 17/00 340/5.2 |
| 2011/0115605 | A1 * | 5/2011 | Dimig | ................... B60R 25/406 340/5.61 |
| 2014/0139331 | A1 * | 5/2014 | Oliver | .................. H04W 4/029 340/426.19 |
| 2016/0020632 | A1 * | 1/2016 | Lickfelt | ................... H02J 50/80 320/108 |

(Continued)

FOREIGN PATENT DOCUMENTS

| | | |
|---|---|---|
| CA | 2975024 A1 | 2/2018 |
| GB | 2319653 A | 5/1998 |
| WO | 2015084852 A1 | 6/2015 |

OTHER PUBLICATIONS

International Search Report and Written Opinion, PCT Application No. PCT/US2021/031060, "Systems and Methods for Key FOB Communication Disconnection," 10 pages.

*Primary Examiner* — Zhen Y Wu
(74) *Attorney, Agent, or Firm* — Christopher G. Darrow; Darrow Mustafa PC (57) ABSTRACT

System, methods, and other embodiments described herein relate to controlling a key fob. In one embodiment, a key fob, associated with a vehicle, includes an antenna, a control circuit including one or more processors and a memory communicably connected to the one or more processors, and a disable switch connected to the antenna and to the control circuit. The disable switch connects the antenna with the control circuit in a first state and disconnects the antenna from the control circuit in a second state.

20 Claims, 5 Drawing Sheets

(56) References Cited

U.S. PATENT DOCUMENTS

| | | | |
|---|---|---|---|
| 2016/0048708 A1* | 2/2016 | Sandler | G06K 7/016 |
| | | | 340/10.1 |
| 2016/0295523 A1* | 10/2016 | Hermann | H04B 1/3827 |
| 2017/0079257 A1* | 3/2017 | Haensgen | H04W 84/18 |
| 2017/0236344 A1* | 8/2017 | Murar | G07C 9/20 |
| | | | 340/5.61 |
| 2017/0289905 A1* | 10/2017 | Chen | H04W 52/0209 |
| 2018/0114106 A1* | 4/2018 | Pheil | H04B 5/0062 |
| 2018/0194323 A1 | 7/2018 | Woodill, Jr. et al. | |
| 2019/0036623 A1 | 1/2019 | Spiess | |
| 2019/0088354 A1* | 3/2019 | Yanowitz | G06F 16/9554 |
| 2019/0149200 A1* | 5/2019 | Kwok | H04B 7/0825 |
| | | | 375/267 |
| 2020/0079322 A1* | 3/2020 | Crocker | G07C 9/29 |
| 2020/0097787 A1* | 3/2020 | Guerrero | H04B 1/3827 |

\* cited by examiner

SYSTEMS AND METHODS FOR KEY FOB COMMUNICATION DISCONNECTION

TECHNICAL FIELD

The subject matter described herein relates to systems and methods for controlling communications between a key fob and a vehicle, and, more particularly, to a key fob having features that can limit receipt of transmission signals and thereby decrease a risk of vehicle theft due to signal boosting techniques.

BACKGROUND

A vehicle may be configured to communicate with a key fob for the purpose of allowing an owner to remotely execute operations such as unlocking doors, opening/closing windows, opening doors, opening a trunk or even starting an engine of the vehicle. In addition, some vehicles utilize a key fob to facilitate "keyless entry", wherein the vehicle detects the presence of the key fob near the vehicle and, in response, allows execution of an action such as unlocking the doors based on the owner touching the door handle.

Although the communication signals a vehicle uses to communicate with the key fob in providing such features may be encrypted or use periodically changing or rolling codes, individuals who desire to steal the vehicle have developed ways to exploit vulnerabilities inherent in the wireless communications used in the vehicle/key fob system. For example, unauthorized individuals have found that a device that physically boosts wireless signals between the vehicle and the fob can enable communication to take place between certain manufacturer's vehicles and their associated fobs when the two are relatively far apart. In some cases, a boost attack can allow an unauthorized individual to unlock a vehicle parked in a driveway of a home, while the fob rests seemingly secure within the home, by tricking the vehicle into incorrectly determining that the fob is nearby.

SUMMARY

In one embodiment, example systems and methods are disclosed for providing a key fob having a communication disconnect switch.

In one approach, a disclosed key fob, associated with a vehicle, includes an antenna, a control circuit including one or more processors and a memory communicably connected to the one or more processors, and a disable switch connected to the antenna and to the control circuit, wherein the disable switch connects the antenna with the control circuit in a first state and disconnects the antenna from the control circuit in a second state.

In one embodiment a method of controlling a key fob, the key fob including an antenna, a control circuit, and a disable switch connected between the antenna and the control circuit such that the disable switch connects the antenna with the control circuit in a first state and disconnects the antenna from the control circuit in a second state is disclosed. The method includes controlling an actuator connected to the disable switch to transition the disable switch to the second state to prevent a signal received at the antenna from being processed by the control circuit and controlling an electronic indicator component to execute a response to the disable switch transitioning between the first state and the second state.

In one embodiment, a non-transitory computer-readable medium is disclosed. The computer-readable medium stores instructions for controlling a key fob, the key fob including an antenna, a control circuit, and a disable switch connected between the antenna and the control circuit such that the disable switch connects the antenna with the control circuit in a first state and disconnects the antenna from the control circuit in a second state. When the instructions are executed by one or more processors, they cause the one or more processors to perform the disclosed functions and include instructions to control an actuator connected to the disable switch to transition the disable switch to the second state to prevent a signal received at the antenna from being processed by the control circuit, and control an electronic indicator component to execute a response to the disable switch transitioning between the first state and the second state.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and embodiments associated with controlling interactions between a vehicle and a key fob are disclosed. The disclosed systems provide multiple advantages that improve security of vehicles, provide measures that mitigate against attacks that exploit vulnerabilities inherent in wireless communication and provide means for discovering lost key fobs and securing a vehicle even when its associated key fob is lost.

In one embodiment, a key fob according to the disclosed subject matter includes an antenna for wireless communication, a control circuit powered by a battery, and a disable switch connected between the antenna and the control circuit. The antenna and control circuit can provide the functionality of a radio transceiver, that is, operated to transmit and receive radio signals. The control circuit can include, for example, a memory and one or more processors/microprocessors. The memory can store one or more modules that include one or more instructions that, when executed by the one or more processors/microprocessors execute functions such as transmitting/receiving various signals to/from a vehicle that the key fob is paired with. The signals can include codewords and identification signals to identify the key fob, as well as command codes (also known as "function codes") transmitted from the key fob to the vehicle to cause the vehicle to perform specific actions, such as unlock a door, open a widow, or start an engine.

The disable switch can have two states. In a first state the disable switch connects the antenna to the control circuit, allowing wireless communication to take place between the key fob and the vehicle. In a second state the disable switch disconnects the antenna from the control switch, thereby preventing certain types of wireless communication between the key fob and the vehicle. The disable switch can include a mechanism, such as a button, a switch or the like, that a user can manually manipulate to transition the switch back and forth between the first state and the second state.

In one or more embodiments, the key fob can include an indication device configured to provide a first type of indication (e.g., visual, audible, haptic, or any combination of these) when the disable switch is placed in the first state. In one or more embodiments, the indication device can be configured to provide a second type of indication, different from the first type of indication, when the disable switch is placed in the second state. For example, in an implementation in which the first type of indication is to activate a light emitting diode (LED) having a first color, the second type of indication can be to deactivate the LED or to activate an LED having a second color different from the first color. In an implementation in which the first type of indication is to emit a first sound (e.g., a single chirp), the second type of indication can be to emit a second sound (e.g., two chirps). In a haptic implementation in which the first type of indication is a single buzz, the second type of indication can be two buzzes.

In one or more embodiments, the key fob can further include at least one secondary communication circuit and an actuator connected to the secondary communication circuit and to the disable switch. The secondary communication circuit can be a wireless communication circuit that can receive a disable signal and, in response, control the actuator to open the disable switch. Conversely, in one or more embodiments the secondary communication circuit can receive an enable signal and, in response, control the actuator to close the disable switch.

In one or more embodiments, the key fob can also include an internal switch disposed between the disable switch and the control circuit. The internal switch may be implemented as one or more circuit elements disposed within a casing of the key fob and therefore not immediately accessible for manual manipulation. Similar to the disable switch, the internal switch can have two states: a closed state in which the disable switch is connected to the control circuit and an open state in which the disable switch is disconnected from the control circuit.

Due to the logic of the circuit connections, the open state of the internal switch inherently disconnects the antenna from the control circuit as well. Thus, the internal switch can essentially override the disable switch and place the key fob in a noncommunicative state regardless of the state of the disable switch. In one or more embodiments, the secondary communication circuit can control the internal switch to place it in an open state or closed state under certain conditions, as will be discussed in detail below.

Figure 1:
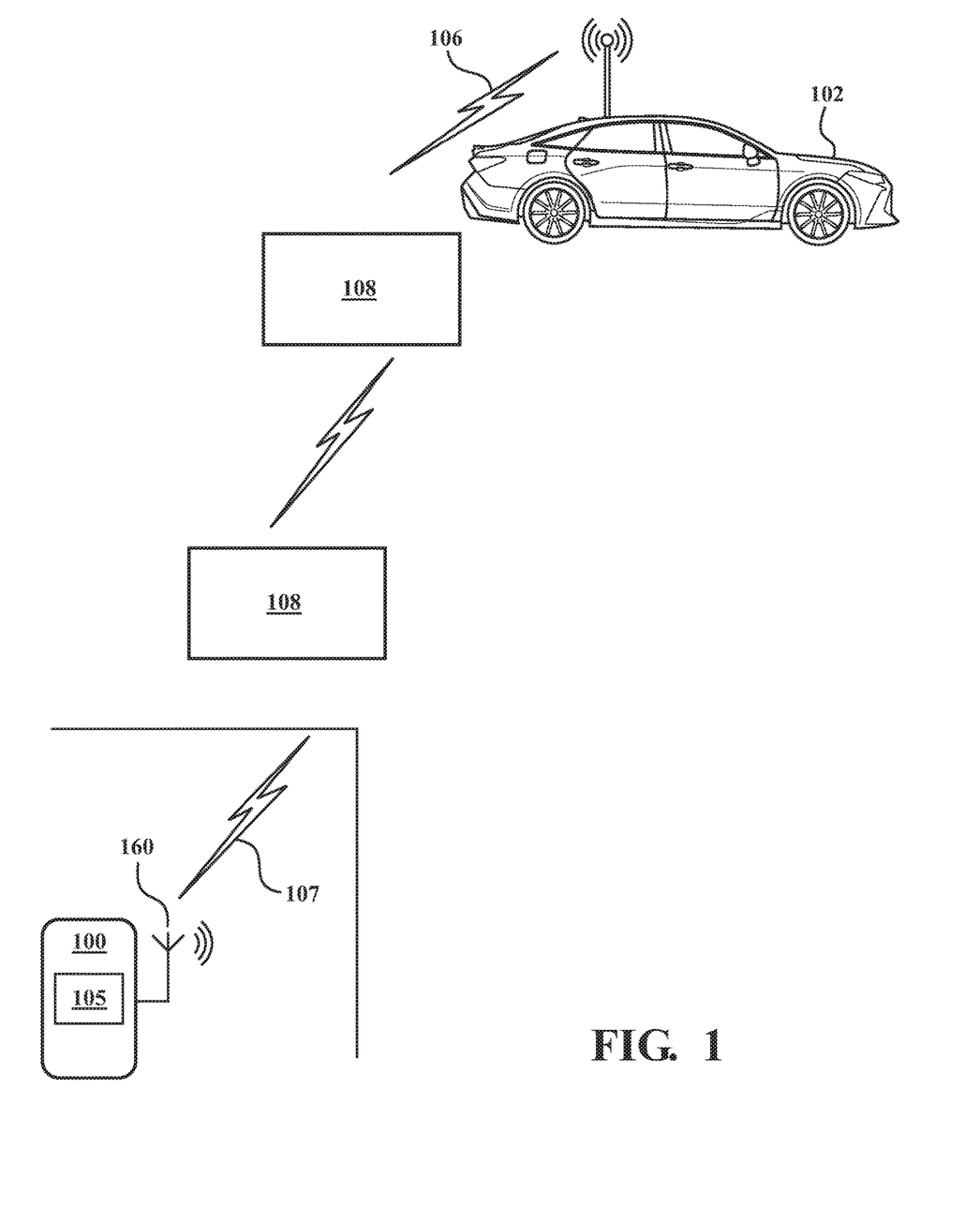
FIG. 1 illustrates a key fob and an associated vehicle according to the disclosed subject matter.

Referring to FIG. 1, one embodiment of a key fob 100 is illustrated. For the purpose of illustration the key fob 100 is not drawn to scale. The key fob 100 may be associated (i.e., paired, synchronized, etc.) with a vehicle 102 such that the key fob 100 and vehicle 102 are configured to communicate wirelessly with each other. For example, the wireless communication can take place through radio signals transmitted/received via the antenna 160. The key fob 100 can further include a control circuit 105 that controls transmission of signals from the key fob 100 and processes signals received by the key fob 100.

The key fob 100 may provide various function related to the vehicle 102, such a keyless entry function. For example, when a user wants to unlock a door or open a trunk of the vehicle, the user can touch a handle of the door and, in response, the vehicle 102 can broadcast a short-range challenge or interrogation signal 106. When the key fob 100 detects the interrogation signal 106, the key fob 100 can, in response, broadcast an identification code signal 107. When the vehicle 102 receives the identification code signal 107 in response to the interrogation signal, the vehicle 102 can confirm that the code matches its own stored code or generated code in a rolling code system. The match indicates the presence of the key fob 100 (and presumably an authorized user). Accordingly, the vehicle 102 can proceed to automatically unlock the door.

However, the keyless entry function is a type of wireless communication function that is vulnerable to attack in various ways. For example, in one known attack referred to as a "boost attack" an unauthorized individual can cause the vehicle 102 to broadcast the interrogation signal, for example by touching a door handle, and use one or more amplifiers 108 to boost the range of the signal. In this attack, even if the key fob 100 is located within a nearby structure (e.g., a home, store, or restaurant) that the authorized user is currently inside, it is possible that the boosted signal may reach the key fob 100 and cause the key fob 100 to broadcast an identification code signal 107 in response. The unauthorized individual may either use an amplifier 108 to boost the identification code signal 107 from the key fob 100 so that it reaches the vehicle 102 or may intercept the identification code signal 107 and retransmit it to the vehicle 102. In either case the objective, which is to trick the vehicle 102 into responding as though the key fob 100 were present, may be obtained and cause the vehicle 102 to perform an unauthorized action, i.e., unlock the door.

Figure 2:
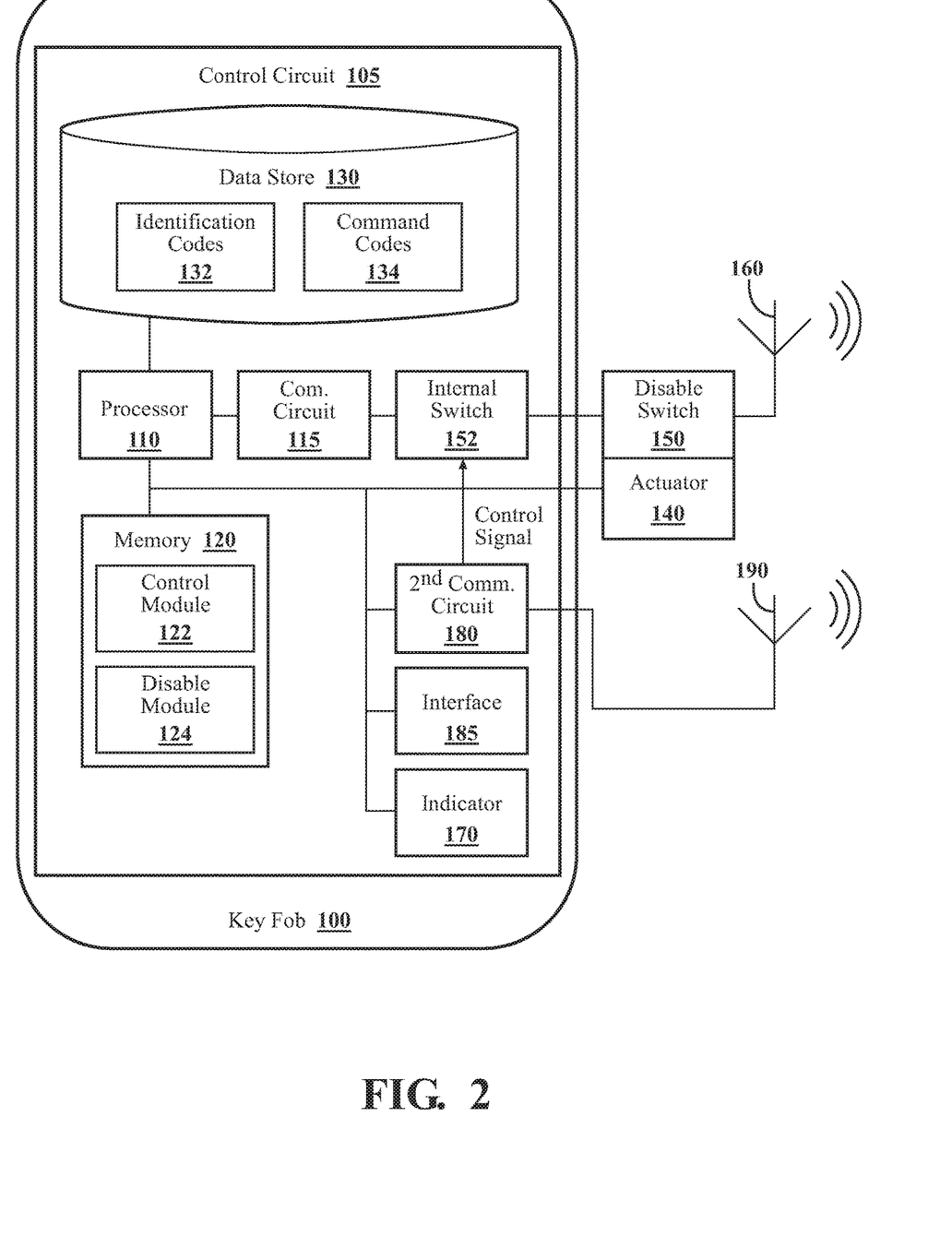
FIG. 2 illustrates an example key fob and control circuit according to the disclosed subject matter.

FIG. 2 shows an embodiment the key fob 100 and control circuit 105 including features that significantly reduce a likelihood of a successful boost attack. The key fob 100 includes a disable switch 150 connected to the control circuit 105 and to the antenna 160. The disable switch 150, in a first state (e.g., closed), connects the antenna 160 to the control circuit 105. In a second state (e.g., open), the disable switch 150 disconnects the antenna 160 from the control circuit 105. When the antenna 160 is disconnected from the control circuit 105, the control circuit 105 will not detect or receive an interrogation signal 106 from the vehicle 102. Thus, even if an unauthorized individual attempts a boost attack, if the disable switch 150 is in the open state the attack will not cause the key fob 100 to transmit an identification code signal 107, since the control circuit 105 will not detect the interrogation signal 106.

In one or more embodiments the disable switch 150 is implemented as a user-accessible switch mechanism (e.g., a push button switch, a sliding switch, a toggle switch, a rotary switch, etc.) that a user may manually manipulate to place the disable switch 150 in the open state or the closed state. As will be discussed further below, the control circuit 105 can include an indicator component 170 that notifies the user of the current communication state of the key fob 100 regarding connection between the antenna 160 and the control circuit 105.

In addition to manual control, in one or more embodiments the control circuit 105 can control an actuator 140 to automatically transition the disable switch 150 to the open state or the closed state in certain circumstances, for example, based on an auto self-disable control setting or a secondary communication signal received by a secondary communication circuit 180, as will be discussed below.

As shown in FIG. 2, the control circuit 105 can include multiple elements, including one or more processors 110, a first communication circuit 115, a memory device 120, an indicator component 170, a secondary communication circuit 180, an internal switch 152, and an interface 185. It should be understood that in different embodiments and configurations, depending on the implementation, it may not be necessary for the control circuit 105 to include all of the elements shown in FIG. 2. For example, one or more embodiments may omit the secondary communication circuit 180 or other elements. Different embodiments of the disclosed subject matter can include control circuits 105 having different combinations of the various elements shown in FIG. 2. Furthermore, for purposes of brevity the present disclosure focuses on elements most relevant to the disclosed subject matter. Accordingly, in actual implementation the control circuit 105 can have additional elements to those shown in FIG. 2 that are required to provide functionality of the device, e.g., a battery, circuit elements, etc. In addition, while the various elements are shown as being located within the control circuit 105 in a certain configuration, it will be understood that one or more of these elements can be disposed in a different configuration within the control circuit 105.

Furthermore, it will be appreciated that for simplicity and clarity of illustration, where appropriate, reference numerals have been repeated among the different figures to indicate corresponding or analogous elements. The discussion outlines numerous specific details to provide a thorough understanding of the embodiments described herein. Those of skill in the art, however, will understand that the embodiments described herein may be practiced using various combinations of these elements.

Referring to FIG. 2, the control circuit 105 is shown as including a processor 110. In various implementations the processor 110 is an electronic device such as a microprocessor, an ASIC, multiple processors/microprocessors, or another computing component that is capable of executing machine-readable instructions to produce various electronic outputs therefrom that may be used to control or cause the control of other electronic devices.

In one embodiment, the control circuit 105 includes a memory 120 that stores a control module 122 and a disable module 124. The memory 120 is a random-access memory (RAM), read-only memory (ROM), a hard-disk drive, a flash memory, or other suitable memory for storing the modules 122 and 124. The modules 122 and 124 are, for example, computer-readable instructions that when executed by the processor 110 cause the processor 110 to perform the various functions disclosed herein. In various embodiments, the modules 122 and 124 can be implemented in different forms that can include but are not limited to hardware logic, an ASIC, components of the processor 110, instructions embedded within an electronic memory, and so on.

The control module 122 is generally constructed including instructions that function to control the processor 110 to execute basic functional operations of the key fob 100, for example, generating codewords or identification codes, broadcasting an identification code signal to a vehicle, processing and responding to inputs received from the interface 185 (buttons, etc.), controlling the communication circuit 115 to transmit command codes (e.g., codes to unlock doors, open trunk, etc.) to the vehicle, processing signals received from the vehicle, etc.

The disable module 124 can generally be constructed including instructions that function to cause the processor 110 to, among other things, determine that the antenna 160 has not received a signal from the vehicle for at least a threshold amount of time and, in response, cause the actuator 140 to transition the disable switch 150 to the open state. Thus, in one or more embodiments, the disable module 124 can implement an optional auto-disable feature.

For example, in one or more embodiments the disable module 124 can ping the vehicle 102 to determine whether the key fob 100 is still within the vehicle 102 or within a limited range vicinity of the vehicle 102. If the vehicle 102 does not respond to the ping signal within a set amount of time and/or does not respond after a set number of pings, the disable module 124 can cause the actuator 140 to transition the disable switch 150 to the open state. In this manner the key fob 100 can automatically disable the antenna 160 from receiving potentially boosted signals after the owner has left the vehicle 102 and forgotten to disengage the antenna 160. In one or more embodiments, this auto-disable feature can be activated or deactivated according to user preference.

In one or more embodiments, the user-accessible portion of the disable switch 150 can be implemented as an indirect control of the actuator 140, such that manipulating the user-accessible portion of the disable switch 150 first initiates a request to the disable module 124 to determine whether the key fob 100 is outside the vehicle 102 before the disable module 124 can cause the actuator 140 to transition the disable switch 150 from the closed state to the open state thereby disabling the antenna 160. Confirmation that key fob 100 is outside of the vehicle 102 before antenna 160 disengagement prevents unintentional disablement of keyless entry features while user is still inside the vehicle 102 and prevents the key fob 100 from being locked inside the vehicle 102 or left inside a running vehicle 102.

The control circuit 105 can also include a secondary communication circuit 180 that allows the control circuit 105 to receive a secondary wireless signal. The secondary communication circuit 180 can be configured to communicate, for example, via a secondary communication protocol such as internet protocol (IP), near field communication (NFC), Bluetooth® (BT), Bluetooth Low Energy (BLE), ultrawide band (UWB), Wifi, radio-frequency identification (RFID), or through other communications methods.

In one or more embodiments, the key fob 100 can be directly addressable under the secondary communication protocol. For example, each manufactured key fob 100 can be assigned a unique address within the secondary communication protocol. In one or more embodiments, the key fob 100 is not assigned an address under the secondary communication protocol but is still configured to receive encoded command signals via the secondary communication protocol. Accordingly, in any case the secondary communication circuit 180 can process signals detected by a second antenna 190 and thereby detect a disable code received via the secondary communication protocol.

The secondary communication circuit 180 can further be connected to an internal switch 152. The internal switch 152 is connected to the disable switch 150 and the control circuit 105. In one or more embodiments, the internal switch 152 is connected to a communication gateway of the control circuit 105, for example, the first communication circuit 115. In a first state (e.g., closed), the internal switch 152 connects the disable switch 150, and by extension the antenna 160, to the rest of the control circuit 105. In a second state (e.g., open), the internal switch 152 disconnects the disable switch and the antenna 160 from the rest of the control circuit 105.

The internal switch 152 can be controlled by the secondary communication circuit 180. For example, the secondary communication circuit 180 can receive a signal via a second antenna 190 and open the internal switch 152 in response. While the internal switch 152 is open, the key fob 100 will not receive signals via the antenna 160.

Thus, the antenna 160 can be disconnected from the control circuit 105 in various ways, including manually by the owner opening the disable switch 150, automatically by the disable module 124 controlling the actuator 140 to open the disable switch 150, or remotely by the secondary communication circuit 180 opening the internal switch 152.

The control circuit 105 can also include an indicator component 170 that provides an indication of a state (e.g., open/closed) of the disable switch 150 and/or internal switch 152. The indicator component 170 can provide visual indication, audible indication, haptic indication, or any combination thereof.

For example, in one or more embodiments the indicator component 170 can include a light-emitting diode (LED) that is configured to turn on when the disable switch 150 is in the open state and turn off when the disable switch 150 is in the closed state. In another embodiment, the indicator component 170 can include a speaker configured to emit a first beeping or chirping pattern (e.g., one beep) when the disable switch 150 transitions to the open state and a second beeping or chirping pattern (e.g., two beeps) when the disable switch 150 transitions to the closed state. In still another embodiment the indicator component 170 can include a small motor configured to vibrate in a first pattern (e.g., one buzz) when the disable switch 150 transitions to the open state and vibrate in a second pattern (e.g., two buzzes) when the disable switch 150 transitions to the closed state. In yet another embodiment the indicator component 170 can include a combination of indicator devices (e.g., LED and motor, LED and speaker, speaker and motor, etc.).

In one or more embodiments, the indicator component 170 can provide a separate indication of a state of the internal switch 152 as compared to the indication of the state of the disable switch 150. For example, in one or more embodiments, the indicator component 170 can include a first color LED (e.g., blue) associated with the disable switch 150 and a second color LED (e.g., red) associated with the internal switch 152.

Referring back to the control circuit 105 of FIG. 2, in one embodiment, the control circuit 105 includes a data store 130, which may be implemented as a database 130. The database 130 is, in one embodiment, an electronic data structure that may be stored in the memory 120 and is configured with routines that can be executed by the processor 110 for analyzing stored data, providing stored data, organizing stored data, and so on. Thus, in one embodiment, the database 130 stores data used by the modules 122 and 124 in executing various determinations. In one embodiment, the database 130 stores data including static or generated identification codes 132 and command codes 134.

Figure 3:
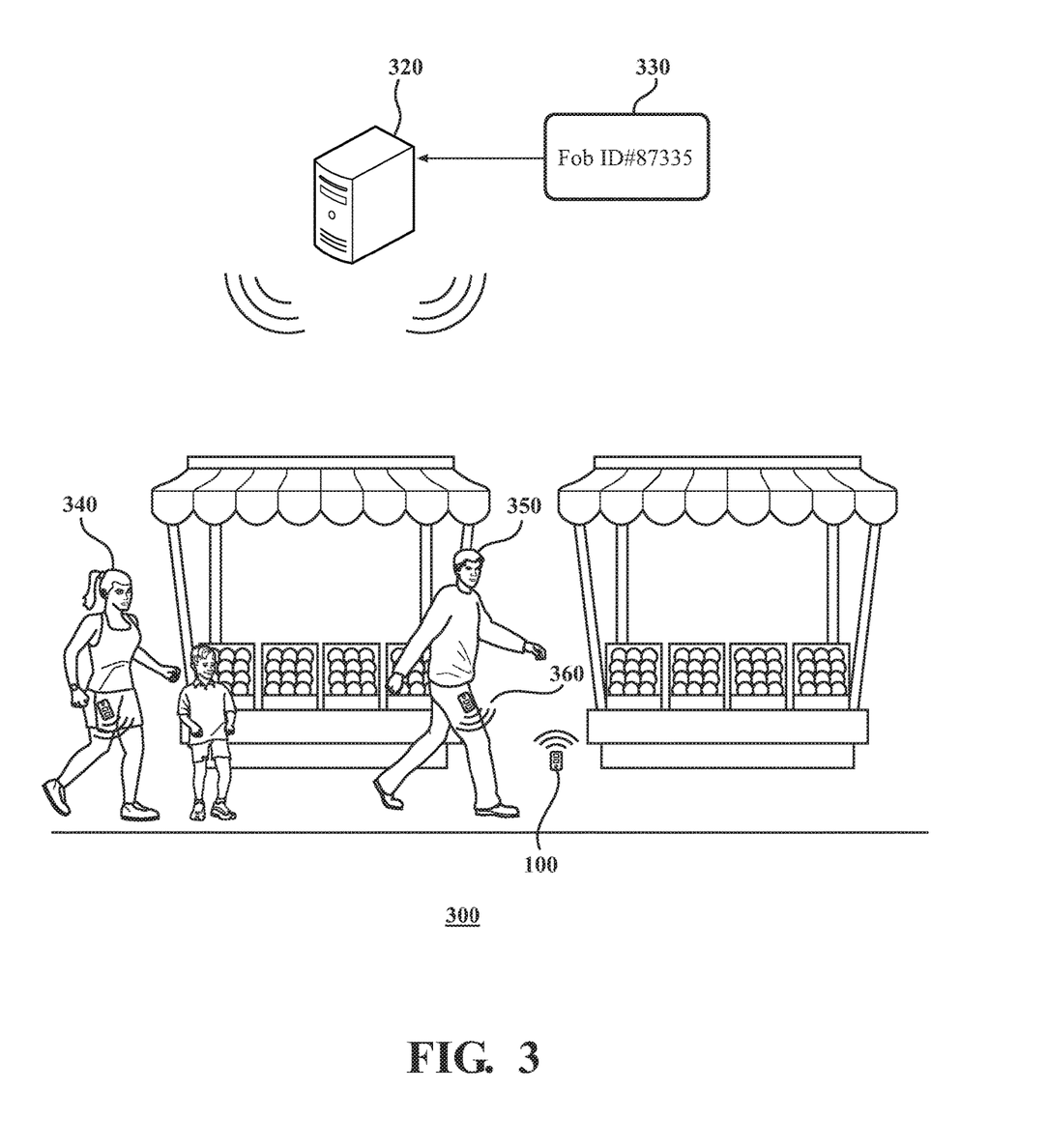
FIG. 3 illustrates an example scenario in which a key fob according to the disclosed subject matter is advantageous.

The above-discussed features allow the disclosed key fob 100 to present a barrier to attack in several situations that would leave a conventional key fob particularly vulnerable. For example, FIG. 3 illustrates an example scene 300 in which a key fob 100 has been lost, e.g., inadvertently dropped inside a store, a market, or the like. When a conventional key fob is lost it is vulnerable to an unauthorized user picking it up, proceeding to the parking lot and repeatedly pressing buttons on the key fob to attempt to cause the associated vehicle to respond. Upon discovering the whereabouts of the associated vehicle, the unauthorized user can unlock the vehicle, enter and, unless other security measures are present (e.g., steering wheel lock), steal the vehicle with relative ease.

In contrast, the disclosed key fob 100 may remotely be placed in a communicative state that is unresponsive to the associated vehicle, thereby preventing an unauthorized user from using the key fob 100 to locate and/or enter the vehicle. For example, a manufacturer of the key fob 100 (or a third party entity) can provide a service that allows an owner of the key fob 100 to remotely open the internal switch 152 upon discovering that the key fob 100 is missing. The service can assign a unique identifier to each key fob 100 participating in the service. The service can further include, for example, a server 320 that allows a user to register a secure account that associates the user (owner) with a key fob and with a registered wireless communication device, such as a cell phone, tablet, watch laptop, etc.

When the user loses the key fob 100, the user can login to the server 320 using the secure account to submit a search and disable request. The request can include an identifier 330 associated with the lost fob. The server 320 can require one or more types of security verifications prior to acting on the request. After the security verifications are complete, in one or more embodiments the server 320 can broadcast the identifier 330 to devices registered to other participating users 340, 350. In an implementation in which the key fob 100 is directly addressable, the server 320 can attempt to transmit an encoded disable command directly to the key fob 100 using the secondary communication protocol. If the key fob 100 directly receives the encoded disable command, accompanied by the key fob identifier 330 associated with the key fob 100, the secondary communication circuit 180 responds by opening the internal switch 152.

The internal switch 152, once opened, cannot be manually closed by an unauthorized user. While the internal switch 152 remains open, the key fob 100 will not communicate with the associated vehicle via the antenna 160, thereby preventing an unauthorized user from using the key fob 100 to locate or unlock the associated vehicle. If the key fob 100 is found or returned to the owner, the owner can again login to the server 320, complete the required identity verifications, and submit a request to send an enable signal to cause the secondary communication circuit 180 to close the internal switch 152, thereby restoring the key fob 100 to normal operational status.

With continued reference to FIG. 3, if the key fob 100 is not directly addressable or the server 320 is unable to reach the key fob 100, the server 320 can broadcast an encoded search and disable signal to registered wireless communication devices that belong to participating users 340, 350. The registered wireless communication devices (e.g., key fob, cell phone, watch, tablet, etc.) may receive the encoded search and disable signal from the server 320 and rebroadcast the signal. For example, a key fob 360 that belongs to participating user 350 may receive the encoded signal carrying key fob 100 identification code and a disable command and, in response, broadcast the signal.

When the participating user 350 passes within a communicative range of the key fob 100, the secondary communication circuit 180 can receive the encoded signal being broadcasted from key fob 360. In response, the secondary communication circuit 180 of the key fob 100 can broadcast a confirmation signal via the second antenna 190 using the secondary communication protocol and open the internal switch 152, thereby disconnecting the antenna 160 from the control circuit 105.

In one or more embodiments, the secondary communication circuit 180 can continue to periodically broadcast the confirmation signal. In this state, the key fob 100 is no longer vulnerable to a boost attack, cannot be used to locate, unlock and drive the vehicle, and can be detected by any registered device passing by that detects the confirmation signal. The registered device can in turn report the receipt of the confirmation signal to the server 320, which can notify the owner of the state of the key fob 100. In one or more embodiments, if the registered device is equipped with a GPS receiver the registered device can also report to the server 320 a location or an approximate location at which the confirmation signal was first received. The owner can thereby be informed of a general area to search for the key fob 100.

As previously discussed, since the antenna 160 is disconnected from the control circuit 105 by the internal switch 152, the disable switch 150 cannot be used to reconnect the antenna 160 to the control circuit 105. When the key fob 100 is found or returned to the owner, the owner can login to the server 320, confirm that the key fob 100 is back in the owner's possession, and request the server 320 to broadcast an encoded signal including the key fob address and enable command to cause the secondary communication circuit 180 to close the internal switch 152, thereby reconnecting the antenna 160 to the control circuit 105 and restoring normal operational functions of the key fob 100.

Figure 4:
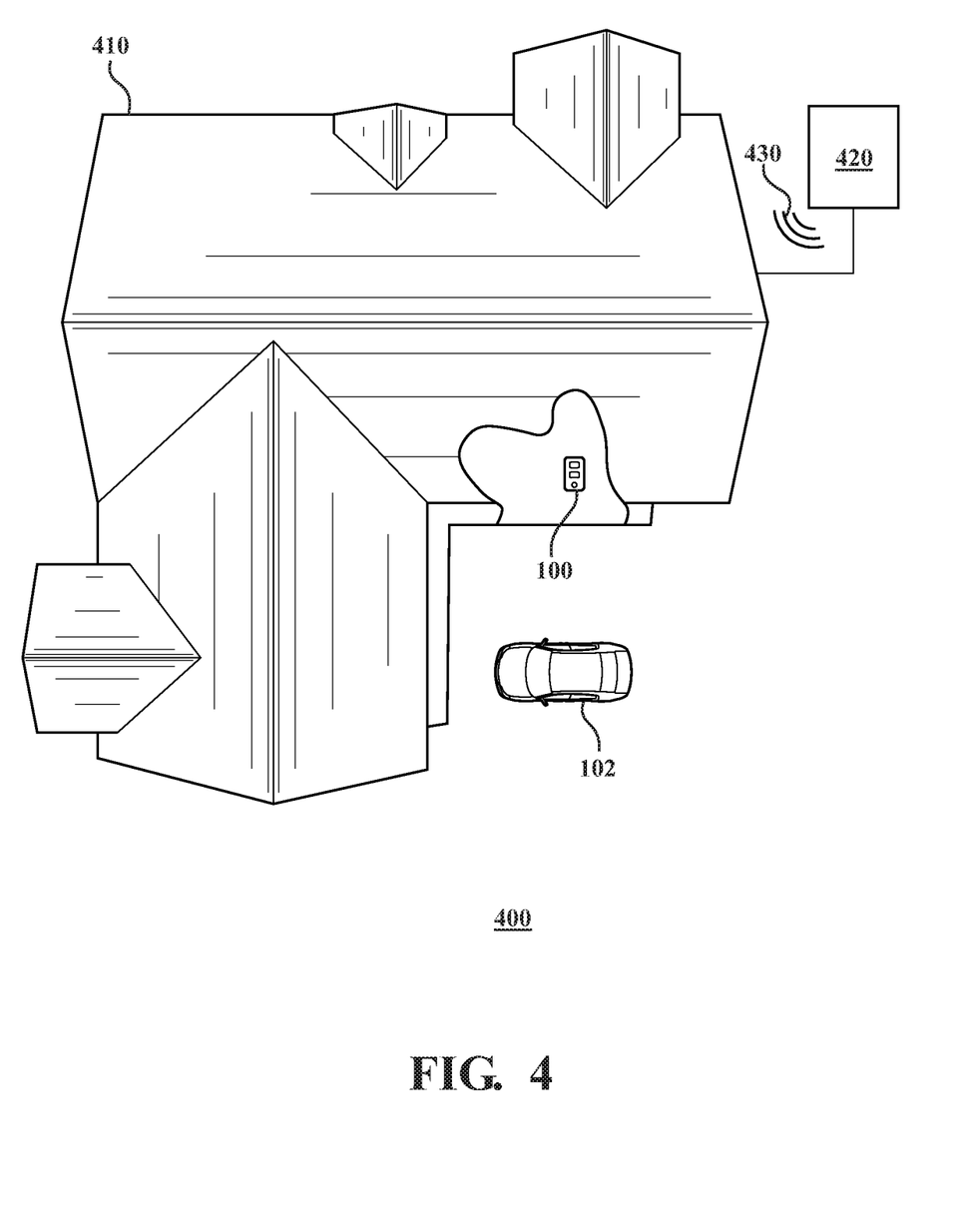
FIG. 4 illustrates another example scenario in which a key fob according to the disclosed subject matter is advantageous.

FIG. 4 illustrates another example scenario 400 in which features of the disclosed key fob 100 can provide a defensive barrier in a situation in which a conventional key fob would be vulnerable to attack. In the example scenario 400 the key fob 100 has been placed inside a home 410 while the vehicle 102 associated with the key fob 100 remains parked nearby outside of the home 410. For example, the owner may be settling down for the night and left the key fob 100 on a stand, counter, etc. In this setting, while a conventional key fob would be particularly vulnerable to a boost attack (e.g., in the middle of the night) the key fob 100 can provide several options to oppose the attack.

First, the owner of the key fob 100 may manually open the disable switch 150 of the key fob 100 upon exiting the vehicle, thereby preventing the key fob 100 from receiving signals from the associated vehicle or sending signals to the vehicle 102. Upon opening the disable switch 150 the indicator component 170 would provide an indication of the communicative state of the key fob 100 (e.g., a chirp and turning on a blue LED). For the duration of the time that the disable switch 150 is open, the key fob 100 would exhibit significant increased resistance to a boost attack or similar signal-based attack.

When the owner is ready to drive the vehicle 102 again, the owner can take note of the indication of the communicative state of the key fob 100 and, in response, close the disable switch 150. Upon closure of the disable switch 150 the indicator component 170 would again provide an indication of the communicative state of the key fob 100 (e.g., a double chirp and turning off the blue LED). Closing the disable switch 150 reconnects the antenna 160 with the control circuit 105, allowing the owner to unlock the vehicle 102 and otherwise utilize the normal operational functions of the key fob 100 in association with the vehicle 102.

As a second option, in one or more embodiments the disable module 124 can automatically control the actuator 140 to open the disable switch 150, for example, based on attempting to ping the associated vehicle 102 and not receiving a response after a threshold amount of time or number of attempts. In one or more embodiments this feature can be activated or deactivated as a user preference setting. For example, if the owner tends to forget to manually open the disable switch 150 after exiting the vehicle 102, this feature can be utilized to automatically open the disable switch 150.

Similar to manual operation, the same boost attack resistance is raised and the indicator component 170 would provide an indication that the disable switch 150 has been opened. Thus, if the owner simply entered the home 410, set the key fob 100 down and carried on, the key fob 100 can automatically defend itself against boost attacks and notify the owner of its communicative state.

As a third option, in one or more embodiments an external system, such as a home security system, wireless computing device, vehicle system, etc., can be scheduled to broadcast an encoded signal including the key fob 100 address and a disable command. In one implementation shown in FIG. 4, for example, a home security system 420 can be programmed to transmit an encoded signal 430 to the key fob 100 address via the secondary communication protocol at 11:00 PM every night. Upon receiving the encoded signal 430, the secondary communication circuit can control the actuator 140 to open the disable switch 150, with the results and outcomes following as discussed above in the first two options.

Thus, the disclosed key fob 100 can provide numerous improvements in security, peace of mind and utility over conventional key fobs by providing various ways, including manual, automatic, and remote, to defend the key fob 100 against certain signal-based attacks.

It should be noted that in one or more embodiments the control circuit 105 can be configured to limit possible output signals based on the connective state of the antenna 160. For example, in one or more embodiments when the disable switch 150 is open the control module 122 can be limited to causing the communication circuit to output a presence signal responsive to a presence check signal from the associated vehicle 102. In this manner if the key fob 100 is inside of the vehicle and the communication circuit 115 directly detects a presence check signal from the vehicle 102 (i.e., the circuit detects the signal without the use of the antenna 160), the key fob 100 can respond to indicate to the vehicle 102 that the key fob 100 is inside the vehicle. Such limited action can allow the key fob 100 to still provide conventional features associated with preventing the key fob 100 from being locked inside the vehicle.

Figure 5:
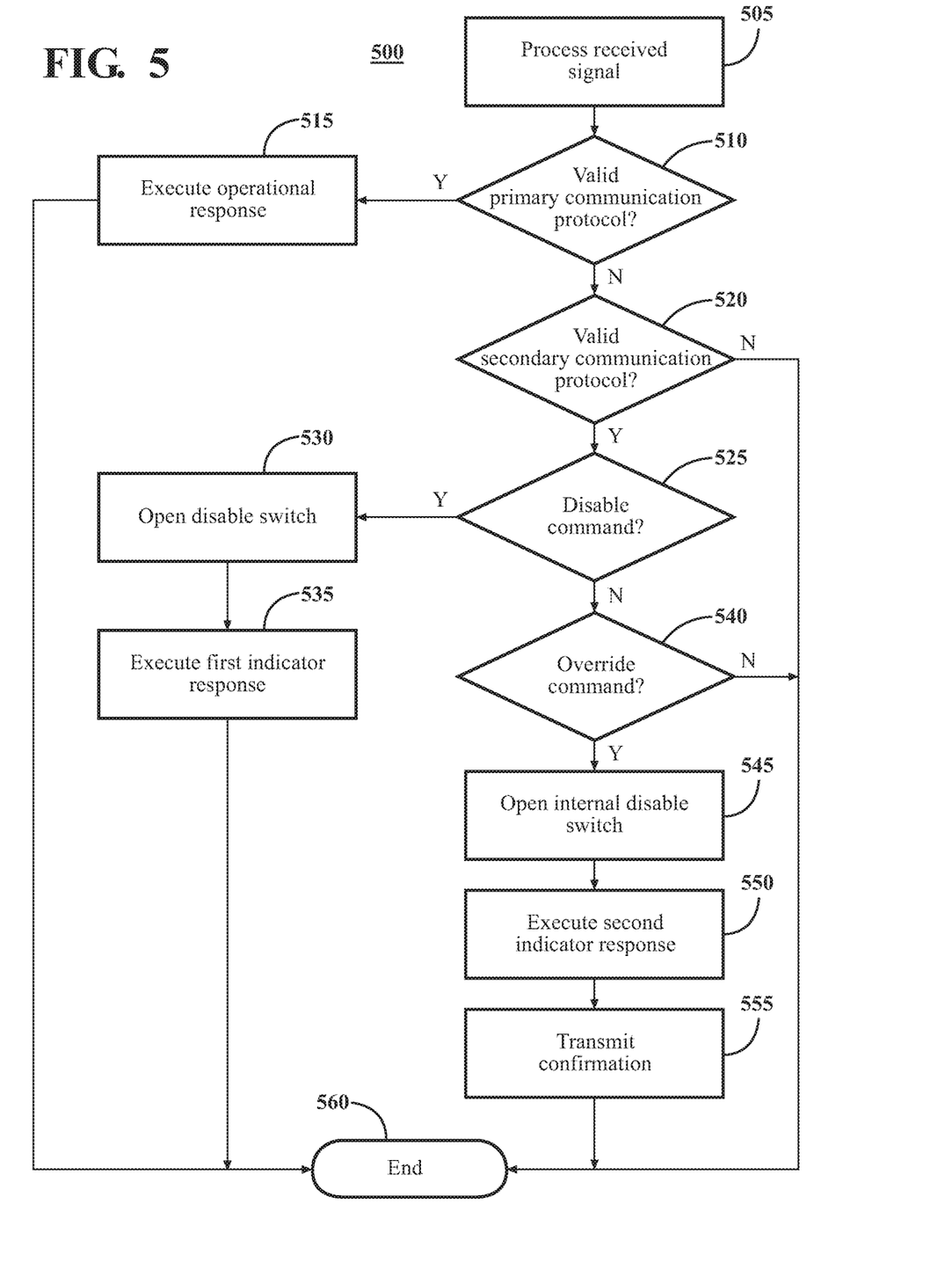
FIG. 5 illustrates a flow chart of a method of controlling a key fob according to the disclosed subject matter.

FIG. 5 illustrates a flowchart of an example method 500 that is associated with operations of the disclosed key fob 100. The method 500 will be discussed from the perspective of the disclosed key fob 100 of FIGS. 1-4. While the method 500 is discussed in combination with the key fob 100, it should be appreciated that the method 500 is not limited to being implemented within the key fob 100, which is merely one example of a type of key fob system that may implement the method 500. Furthermore, one of ordinary skill in the art will recognize that the method 500 is merely one example method of implementing the disclosed embodiments. Different variations may be constructed according to implementation in a given setting or situation.

At operation 505 the key fob 100 receives a signal. At operation 510 the control circuit 105 (e.g., control module 122) checks whether the signal is a valid signal encoded in the primary communication protocol and directed to the key fob 100. For example, the control module 122 can determine whether the signal includes necessary identifiers and/or codes to validate that the signal was sent from the associated vehicle 102.

If the signal is valid and encoded in the primary communication protocol, at operation 515 the control circuit 105 (e.g., control module 122) processes the signal and executes a corresponding response (e.g., respond to a presence check signal from the vehicle 102). The process then ends at operation 560.

If the signal is not a valid signal encoded in the primary communication protocol, at operation 520 the control circuit (e.g., secondary communication circuit 180) determines whether the signal is a valid signal encoded in the secondary communication protocol directed to the key fob 100. For example, in one or more embodiments, if the key fob 100 is addressable under the secondary communication protocol the secondary communication circuit 180 can determine whether the signal includes the correct address for the key fob 100. Other security, ID and validation checks may be used to check the signal. If the secondary communication circuit 180 determines that the signal is not a valid signal encoded in the secondary communication protocol, the signal is ignored and the process ends at operation 560.

If the secondary communication circuit 180 determines that the signal is a valid signal encoded in the secondary communication protocol, at operation 525 the secondary communication circuit 180 determines whether the signal includes a command to open the disable switch 150.

If secondary communication circuit 180 determines that the signal includes a disable command (e.g., received from a home security system), at operation 530 the control circuit 105 opens the disable switch 150. For example, the disable module 124 can control the actuator 140 to cause the disable switch 150 to transition from a first state (closed) to a second state (open).

At operation 535 the control circuit 105 (e.g., disable module 124) controls the indicator component 170 to execute an indication response to the disable switch 150 transitioning between the first state and the second state. For example, in one or more embodiments the indicator component 170 is an electronic indicator component including a visual indicator (e.g., an LED). In this case, the disable module 124 can execute the response to the disable switch transition by transitioning the visual indicator to a first visual state (e.g., blue light on) when the disable switch connects the antenna with the control circuit, and transitioning the visual indicator to a second visual state (e.g., blue light off) different from the first visual state when the disable switch disconnects the antenna from the control circuit. The process then ends at operation 560.

If the secondary communication circuit 180 determines that the signal does not include a disable command, at operation 540 the secondary communication circuit 180 determines whether the signal includes a valid override command to open the internal switch 152. If the secondary communication circuit 180 determines that the signal does not include a valid override command, then the signal is ignored and the process ends at operation 560.

If secondary communication circuit 180 determines that the signal does include a valid override signal, at operation 545 the secondary communication circuit 180 transitions the internal switch 152 from a first state (closed) to a second state (open). Opening the internal switch 152 disconnects the disable switch 150 and the antenna 160 from the control circuit 105, thereby overriding the functionality of the disable switch 150 and placing the key fob 100 in a noncommunicative state in reference to the primary communication protocol.

At operation 550, the control circuit 105 can execute a secondary indicator response. In one or more embodiments, the secondary indicator response is different from the indicator response associated with the disable switch 150, as discussed above.

At operation 555, the control circuit 105 (e.g., secondary communication circuit 180) can transmit a confirmation signal indicating that the internal switch 152 has been opened. The process ends at operation 560.

Accordingly, the disclosed key fob 100 can advantageously raise a barrier against boost attacks by incorporating features that allow for multiple ways to place the key fob 100 in an uncommunicative state. Thus, the disclosed embodiments significantly reduce a likelihood of unauthorized individuals successfully exploiting certain types of vulnerabilities inherence in wireless communication commands.

In addition to the above described configurations, it should be appreciated that the key fob 100 from FIG. 1 can be configured in various arrangements with separate integrated circuits and/or chips. In such embodiments, the control module 122 and disable module 124 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 122 and 124 may be combined into a separate application-specific integrated circuit. In further embodiments, portions of the functionality associated with the modules 122 and 124 may be embodied as firmware executable by a processor and stored in a non-transitory memory. In still further embodiments, the modules 122 and 124 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 500 of FIG. 5) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

As previously described, the key fob 100 can include one or more processors 110. In one or more arrangements, the processor(s) 110 can be a main processor of the key fob 100. For instance, the processor(s) 110 can be an electronic control unit (ECU). The key fob 100 can include one or more data stores for storing one or more types of data. The data stores can include volatile and/or non-volatile memory.

Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A key fob, associated with a vehicle, comprising:
   an antenna;
   a control circuit including one or more processors and a memory communicably connected to the one or more processors;
   a disable switch, comprising a physical mechanism that a user can manually manipulate, connected to the antenna and to the control circuit;
   an actuator connected to the disable switch; and
   a secondary wireless communication circuit, connected to the actuator, configured to receive at least a disable signal and an enable signal, and further configured to control the actuator to transition the disable switch to a second state in response to the disable signal and transition the disable switch to a first state in response to the enable signal,
   wherein the disable switch connects the antenna with the control circuit in the first state and disconnects the antenna from the control circuit in the second state, and
   wherein the key fob wirelessly communicates with the vehicle using a primary communication protocol and the secondary wireless communication circuit is configured to communicate using a secondary communication protocol that is different from the primary communication protocol.

2. The key fob of claim 1, further comprising a visual indicator configured to transition to a first visual state when the disable switch connects the antenna with the control circuit and transition to a second visual state different from the first visual state when the disable switch disconnects the antenna from the control circuit.

3. The key fob of claim 1, further comprising an audio indicator configured to emit a first sound when the disable switch connects the antenna with the control circuit and emit a second sound different from the first sound when the disable switch disconnects the antenna from the control circuit.

4. The key fob of claim 1, wherein the secondary communication protocol is at least one of:
   internet protocol (IP);
   near field communication (NFC);
   ultrawide band (UWB);
   Bluetooth® (BT);
   Bluetooth® Low Energy (BLE); or
   radio-frequency identification (RFID).

5. The key fob of claim 1, further comprising an internal switch connected between the disable switch and the control circuit, wherein the secondary wireless communication circuit is further configured to receive an override signal and, in response to the override signal, transition the internal switch to an open state that disconnects the antenna from the control circuit.

6. The key fob of claim 5, further comprising an indicator component configured to provide a first indication when the disable switch is open and provide a second indication different from the first indication when the internal switch is open.

7. The key fob of claim 1, wherein the memory stores a disable module including one or more instructions that, when executed by the one or more processors, cause the one or more processors to determine that the antenna has not received a signal from the vehicle for at least a threshold amount of time, and in response, cause the actuator to transition the disable switch to the second state.

8. A method of controlling a key fob associated with a vehicle, the key fob including an antenna, a control circuit, and a disable switch, comprising a mechanism that a user can manually manipulate, connected between the antenna and the control circuit such that the disable switch connects the antenna with the control circuit in a first state and disconnects the antenna from the control circuit in a second state, the method comprising:
   controlling an actuator connected to the disable switch to, in response to receiving a disable signal via a wireless communication circuit, transition the disable switch to the second state to prevent a signal received at the antenna from being processed by the control circuit; and
   controlling an electronic indicator component to execute a response to the disable switch transitioning between the first state and the second state.

9. The method of claim 8, wherein the electronic indicator component includes a visual indicator, and the controlling the electronic indicator component to execute the response further comprises:
   transitioning the visual indicator to a first visual state when the disable switch connects the antenna with the control circuit; and transitioning the visual indicator to a second visual state different from the first visual state when the disable switch disconnects the antenna from the control circuit.

10. The method of claim 8, wherein the electronic indicator component includes an audio indicator, and the controlling the electronic indicator component to execute the response further comprises:
  emitting a first sound via the audio indicator when the disable switch connects the antenna with the control circuit; and
  emitting a second sound via the audio indicator different from the first sound when the disable switch disconnects the antenna from the control circuit.

11. The method of claim 8, wherein the key fob further comprises a secondary wireless communication circuit connected to the actuator, the method further comprising:
  receiving, by the secondary wireless communication circuit, a disable signal; and
  controlling the actuator to transition the disable switch to the second state in response to the secondary wireless communication circuit receiving the disable signal,
  wherein the key fob communicates with the vehicle using a primary communication protocol and the secondary wireless communication circuit is configured to communicate using a secondary communication protocol that is different from the primary communication protocol.

12. The method of claim 11, wherein the secondary communication protocol is at least one of:
  internet protocol (IP);
  near field communication (NFC);
  Bluetooth® (BT);
  Bluetooth® Low Energy (BLE); or
  radio-frequency identification (RFID).

13. The method of claim 11, wherein the key fob further comprises an internal switch connected between the disable switch and the control circuit, the method further comprising:
  receiving, by the secondary wireless communication circuit, an override signal; and
  transitioning the internal switch to an open state that disconnects the antenna from the control circuit in response to the override signal.

14. The method of claim 13, further comprising controlling the electronic indicator component to have a response to the override signal that is different from a response to the disable signal.

15. A non-transitory computer-readable medium storing instructions for controlling a key fob associated with a vehicle, the key fob including an antenna, a control circuit, and a disable switch, comprising a mechanism that a user can manually manipulate, connected between the antenna and the control circuit such that the disable switch connects the antenna with the control circuit in a first state and disconnects the antenna from the control circuit in a second state, and that when executed by one or more processors cause the one or more processors to:
  control an actuator connected to the disable switch to transition the disable switch to the second state to prevent a signal received at the antenna from being processed by the control circuit;
  control an electronic indicator component to execute a response to the disable switch transitioning between the first state and the second state;
  receive, by a secondary wireless communication circuit connected to the actuator, a disable signal; and
  control the actuator to transition the disable switch to the second state in response to the secondary wireless communication circuit receiving the disable signal,
  wherein the key fob communicates with the vehicle using a primary communication protocol and the secondary wireless communication circuit is configured to communicate using a secondary communication protocol that is different from the primary communication protocol.

16. The non-transitory computer-readable medium of claim 15, wherein the secondary communication protocol is at least one of:
  internet protocol (IP);
  near field communication (NFC);
  Bluetooth® (BT);
  Bluetooth® Low Energy (BLE); or
  radio-frequency identification (RFID).

17. The non-transitory computer-readable medium of claim 15, wherein the key fob further comprises an internal switch connected between the disable switch and the control circuit, further comprising instructions to:
  receive, by the secondary wireless communication circuit, an override signal; and
  transition the internal switch to an open state that disconnects the antenna from the control circuit in response to the override signal.

18. The non-transitory computer-readable medium of claim 17, further comprising instructions to control the electronic indicator component to have a response to the override signal that is different from a response to the disable signal.

19. The non-transitory computer-readable medium of claim 15, wherein the electronic indicator component includes a visual indicator, and the instructions to control the electronic indicator component to execute the response further comprise instructions to:
  transition the visual indicator to a first visual state when the disable switch connects the antenna with the control circuit; and
  transition the visual indicator to a second visual state different from the first visual state when the disable switch disconnects the antenna from the control circuit.

20. The non-transitory computer-readable medium of claim 15, wherein the electronic indicator component includes an audio indicator, and the instructions to control the electronic indicator component to execute the response further comprise instructions to:
  emit a first sound via the audio indicator when the disable switch connects the antenna with the control circuit; and
  emit a second sound via the audio indicator different from the first sound when the disable switch disconnects the antenna from the control circuit.

* * * * *

UNITED STATES PATENT AND TRADEMARK OFFICE
CERTIFICATE OF CORRECTION

Page 1 of 1

PATENT NO. : 11,180,114 B1
APPLICATION NO. : 16/869067
DATED : November 23, 2021
INVENTOR(S) : Evan A. Vijithakumara It is certified that error appears in the above-identified patent and that said Letters Patent is hereby corrected as shown below:

In the Claims

Column 16, Claim 8, Line 9-11: delete "to, in response to receiving a disable signal via a wireless communication circuit, transition" and insert --to transition, in response to receiving a disable signal via a wireless communication circuit,--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*